US012806851B2

(12) United States Patent
Strachauer et al.

(10) Patent No.: US 12,806,851 B2
(45) Date of Patent: Nov. 24, 2026

(54) FIBRE INTERLAYERS

(71) Applicants: GKN Aerospace Deutschland GmbH, Munich (DE); Cead B.V., Delft (NL)

(72) Inventors: Frank Strachauer, Munich (DE); Maarten Jan Logtenberg, Delft (NL); Jasper Vincent Maria Weghorst, Delft (NL)

(73) Assignees: GKN Aerospace Deutschland GmbH, Munich (DE); Cead B.V., Delft (NL)

( * ) Notice: Subject to any disclaimer, the term of this patent is extended or adjusted under 35 U.S.C. 154(b) by 70 days.

(21) Appl. No.: 17/848,709

(22) Filed: Jun. 24, 2022

(65) Prior Publication Data

US 2023/0079104 A1 Mar. 16, 2023

(30) Foreign Application Priority Data

Jun. 25, 2021 (EP) .................................... 21181807

(51) Int. Cl.

| | |
|---|---|
| ***B29C 64/118*** | (2017.01) |
| ***B29C 64/194*** | (2017.01) |
| ***B29C 64/209*** | (2017.01) |
| ***B29C 64/218*** | (2017.01) |
| ***B33Y 10/00*** | (2015.01) |
| ***B33Y 30/00*** | (2015.01) |
| ***B33Y 70/10*** | (2020.01) |
| *B29K 79/00* | (2006.01) |
| *B29K 105/10* | (2006.01) |

(Continued)

(52) U.S. Cl.

CPC .......... *B29C 64/118* (2017.08); *B29C 64/194* (2017.08); *B29C 64/209* (2017.08); *B29C 64/218* (2017.08); *B33Y 10/00* (2014.12); *B33Y 30/00* (2014.12); *B33Y 70/10* (2020.01); *B29K 2079/085* (2013.01); *B29K 2105/106* (2013.01); *B29K 2105/145* (2013.01); *B29K 2307/04* (2013.01); *B33Y 80/00* (2014.12)

(58) Field of Classification Search

None

See application file for complete search history.

(56) References Cited

U.S. PATENT DOCUMENTS 6,899,777 B2 * 5/2005 Vaidyanathan .... G05B 19/4099 419/24
10,571,464 B2 2/2020 Cohen et al.

(Continued)

FOREIGN PATENT DOCUMENTS

CN 110229011 A * 9/2019
GB 2526328 A 11/2015

(Continued)

OTHER PUBLICATIONS

EP 0648806 (Year: 2023).*
CN 107813568 (Year: 2023).*
CN-110229011-A (Year: 2019).*

*Primary Examiner* — Xiao S Zhao
(74) *Attorney, Agent, or Firm* — Sheppard Mullin Richter & Hampton LLP

(57) ABSTRACT

A method of forming a multi-component composite material additive manufacture apparatus is described along with an apparatus therefor. The process involves laying a plurality of materials as part of the same process with a range of continuous and discontinuous fiber reinforcement options designed to optimize the operational capabilities of a component.

13 Claims, 7 Drawing Sheets

(51) Int. Cl.

| | |
|---|---|
| *B29K 105/14* | (2006.01) |
| *B29K 307/04* | (2006.01) |
| *B33Y 80/00* | (2015.01) |

(56) References Cited

U.S. PATENT DOCUMENTS

| | | | | |
|---|---|---|---|---|
| 10,571,642 | B1 | 2/2020 | Cohen et al. | |
| 2002/0040900 | A1* | 4/2002 | Arx | B29C 66/91218 219/544 |
| 2002/0178672 | A1* | 12/2002 | Robinson | E04C 2/22 52/309.1 |
| 2002/0180095 | A1* | 12/2002 | Berard | B29B 9/14 264/237 |
| 2006/0110599 | A1* | 5/2006 | Honma | B32B 5/24 428/522 |
| 2006/0261509 | A1* | 11/2006 | Lustiger | B29C 45/0001 264/211 |
| 2012/0055327 | A1* | 3/2012 | Holowczak | F41H 5/0414 89/917 |
| 2013/0056672 | A1* | 3/2013 | Johnston | C22C 47/025 252/62.51 R |
| 2013/0180769 | A1* | 7/2013 | Aoshima | B32B 17/10036 174/258 |
| 2014/0050921 | A1* | 2/2014 | Lyons | B22F 12/30 428/401 |
| 2014/0265020 | A1* | 9/2014 | Hollander | B29C 65/62 264/258 |
| 2016/0067928 | A1* | 3/2016 | Mark | B29C 70/16 425/150 |
| 2017/0072587 | A1* | 3/2017 | La Forest | B22F 10/18 |
| 2017/0232674 | A1* | 8/2017 | Mark | B29C 31/042 264/308 |
| 2018/0370129 | A1 | 12/2018 | Natale et al. | |
| 2019/0291346 | A1* | 9/2019 | Rudolph | B33Y 10/00 |
| 2019/0315056 | A1 | 10/2019 | Stuart et al. | |
| 2019/0322057 | A1* | 10/2019 | Evans | B33Y 80/00 |
| 2019/0366627 | A1 | 12/2019 | Albor et al. | |
| 2020/0114539 | A1 | 4/2020 | Shim et al. | |
| 2020/0139642 | A1* | 5/2020 | Sauer | B32B 5/26 |
| 2020/0272129 | A1* | 8/2020 | Crothers | G06Q 10/06311 |
| 2020/0324493 | A1* | 10/2020 | Baser | B29C 70/84 |
| 2021/0122884 | A1* | 4/2021 | Mannari | C08K 5/06 |

FOREIGN PATENT DOCUMENTS

| | | | |
|---|---|---|---|
| WO | 2020087048 | A2 | 4/2020 |
| WO | 2020087048 | A3 | 4/2020 |

* cited by examiner

FIBRE INTERLAYERS

CROSS-REFERENCE TO RELATED APPLICATIONS

This application claims priority to European Patent Office Application No. EP 21181807.5, filed on Jun. 25, 2021, which application is hereby incorporated herein by reference in its entirety.

TECHNICAL FIELD

The present disclosure is concerned with an apparatus and manufacturing method for fiber additive manufacture. The apparatus and method described herein are particularly, but not exclusively, suitable for complex multi-layered composite components of the type used in the aerospace industry. As described herein, the apparatus and method have numerous other applications.

BACKGROUND

The term 'composite component' is intended to refer to a component that comprises a thermoplastic material and also reinforcing fibers. One example in the art is Carbon Fiber Reinforced Plastic (CFRP). This material is a well-used composite material used in the aerospace industry for manufacturing a range of components.

Components are formed using such a conventional composite material by laying-up, that is placing a woven fiber material onto a mold corresponding to the desired shape of the component to be manufactured. This is repeated a number of times to create a multi-layered structure. A resin may be impregnated onto the fiber or may be added to the structure. The resulting structure is then cured, for example in an autoclave, to allow for consolidation of the resin which can also harden. A hardened composite component comprising the fibers encapsulated in resin can then be created.

Such a technique is widely used in the aerospace industry to create highly accurate CFRP components and tooling which are both extremely light and strong. A drawback of these conventional methods is that although they allow highly accurate components to be manufactured they are generally highly labor intensive unless auto-lay-up machines are used. Such machines decrease manufacturing times but dramatically increase costs. Furthermore, such machines can be extremely complex and large. Still further, the ability of optimize local regions of components in terms of thermal and mechanical properties is not easily realized.

SUMMARY

Described herein are an alternative apparatus and method for creating composite components of the type suitable for the aerospace and other industries.

Specifically, an apparatus and method described herein provide a highly versatile arrangement that not only allows for complex three-dimensional shapes and profiles to be formed but also allows for local control of thermal and mechanical properties, amongst other advantages, to be realized in a high throughput manufacturing process.

Viewed from a first aspect, there is provided a method of forming a multi-layer thermoplastic component, the method comprising the steps of: (A) laying a first layer of thermoplastic material into a predetermined shape; (B) laying, on top of the previous layer, a second layer of thermoplastic material together with or without fibrous material compressed onto the thermoplastic material; and (C) repeating step (B) until a predetermined number of layers have been layered.

According to the method and apparatus described herein, it is possible to provide a discontinuous process in which the extrusions and laying of fibers are performed sequentially, i.e., one after the other. Another way to describe this is an 'in-line process'.

By separating the process of the placement of the thermoplastic and the placement of the impregnated continuous fibers it is possible to provide a highly controllable and adaptable process. Conventional co-extrusion processes do not provide for this new level of control.

The method and apparatus not only allows complex components to be formed but also allows for control of the mechanical and thermal performance of the resulting component on a layer-by-layer basis as described herein.

Advantages of an apparatus and method described herein include, but are not limited to:

1. Method for combining a thermoplastic material (primary layer) with pre-impregnated fibrous material (secondary layer) in one step inline.
2. Combination of short and continuous/long fiber
3. Possibility of implementing continuous/long fibers in uni-, bi- and multi-directional orientation at same time
4. Possibility to start and stop continuous fiber feeding during printing to reduce the coefficient of thermal expansion (CTE) at specific places of the product.
5, Very low coefficient of thermal expansion (CTE) to meet high dimensional accuracy at high temperatures
6. Upscalable 3D printing process for large applications, high mass output and thick single wall thickness of 15-20 mm or more for reduced printing time
7. Combination of different matrix systems for primary and secondary layers
8. Variable ratio of short fiber to long fiber by separate process execution can be used to tailor material properties and thermal expansion behavior to specific part requirements It will be recognized that the features and advantages described above with reference to the apparatus statements apply equally and interchangeably to the method of manufacturing.

The acronym '3DP' used herein is intended to refer to the process of three-dimensional printing, specifically the process of building a three-dimensional component or part by successive layers of printing to achieve the desired finished component geometry.

The second layer formed according to the method may be in the form of a thermoplastic material containing a fibrous component. The fibrous component may, for example, be in the form of an elongate carbon fiber or other components which have advantageous mechanical properties such as tensile strength.

For example, the fibrous component may be selected from (a) a continuous fiber extending through the thermoplastic; or (b) a plurality of discrete discontinuous fibers extending through the thermoplastic. This selection may be made according to the desired mechanical and thermal properties of the component as a whole or a sub-set of the component.

Each of the first and second layers may also be laid as a plurality of adjacent strips, each strip abutting with an adjacent strip to form a continuous layer surface extending in multiple directions. Thus, a narrower print head can be used whilst still forming a large width complex component.

Furthermore, the fibers within the second and subsequent layers may be selectively cut or separated at predetermined lengths before being laid upon a preceding layer. Again, the thermal and mechanical properties of each layer may therefore be optimized and aligned with the desired performance of the component. A high level of control can therefore be achieved. For example, the mechanical properties of a component may be non-uniform through the thickness and width of the component. Similarly the thermal properties may also be adapted allowing for not only complex geometries but the added controllability of mechanical and thermal properties.

The fibers within the second layer may for example be cut at lengths according to a predetermined fiber length distribution across each layer and through the thickness of the component.

The second and subsequent layers may be laid immediately after each first (preceding) layer within a pair of first and second layers. The timing may be such that bonding (welding) of the two layers is achieved as the two layers are laid against each other. Heat sources which could be in the form of a light source and/or hot air may be used to pre-heat existing layers for improving the bonding/adhesion between different layers Furthermore, the second layer may be laid at an angle with respect to the angle at which the first or preceding layer has been laid. Thus in combination with the fibrous component the mechanical properties can be adjusted again to provide the desired overall mechanical performance of the component. By laying fibers at different angles with respect to one-another it is possible to provide structural strength in multiple directions.

The second layer may be laid by means of a feed mechanism wherein the feed mechanism may be selectively controlled so as to selectively start and stop feed of the fibrous containing layer during laying of the first and second layers. Thus, the fibrous content of each layer can be controlled.

Advantageously some layers may not contain any fibrous content at all thereby further allowing for controllability of the resultant product being formed, as well as the properties of the resultant product being formed.

One or more of the lengths, distribution and/or relative angle of laying up of the reinforcement fibers with respect to one or more preceding layer(s) may be changed between different layers of the component being manufactured. A highly optimized layered component can thus be created with varying strength, rigidity and thermal performance both cross and through the component. Finite element analysis and stress/thermal modelling may allow for each layer of a component to be optimized. A tapered performance profile through and across the component may be realized according to a method and apparatus described herein.

For example, the laying up of the first and/or second layers may be performed according to a predetermined fiber distribution profile corresponding to a predetermined mechanical and/or thermal operating profile of the component.

Still further, a preceding layer is pre-heated prior to a subsequent layer being laid upon the layer. Pre-heating a preceding layer enhances the bonding (welding) between adjacent (and preceding) layers and also allows for large area components to be formed whilst maintaining good bonding (welding) between adjacent (and preceding) layers.

After being laid a compaction force may also advantageously be applied to the upper surface of the top layer. The main function of this component is to pressurize/push the tape into the hot bead/layer preventing air voids as well. The compaction roller/wheel is cooled to prevent the thermoplastic material from sticking on to the wheel. This may, for example, by means of a cylindrical roller arranged in line with the laying up process. Such a roller may be heated and or cooled to adjust how the bonding (welding) between adjacent layers takes place. The compaction force can be adjusted by adjusting the roller height. The roller improves the interlaminar strength, prevents air voids, and ensures a precisely defined material height. It may also have variable pressure to ensure a quality body between preceding layers.

The fibrous material may for example be carbon fibers with PEI manufactured by Toray Advanced Composites, and the thermoplastic may be PEI with carbon short fibers manufactured by Airtech Advanced Materials Group.

Viewed from another aspect there is provided a multi-component composite material additive manufacture apparatus comprising: a primary layer laying unit arranged in use to lay a layer of primary material onto a substrate or preceding layer of a component; and a secondary layer laying unit arranged to feed a secondary material onto the primary or preceding layer, said secondary material containing a continuous or discontinuous fibrous material content.

The apparatus may be arranged in use to lay the primary layer in a first direction as a plurality of adjacent strips of primary material, each strip in abutment to an adjacent strip and collectively forming a primary layer.

Furthermore, the apparatus may also be arranged in use to lay one or more of the secondary layers in a different laying direction to that of the primary and/or a preceding secondary layer.

The apparatus may also be arranged in use to selectively cut or separate the fibrous material within the secondary layer prior to laying onto a preceding primary layer. Thus, the mechanical properties of each layer can be controlled as discussed above.

A heating apparatus may additionally be arranged to heat an upper surface of a preceding primary layer prior to laying of a secondary layer. Furthermore, a compression arrangement may be provided and arranged to compress a laid secondary layer against a preceding primary layer. Advantageously, such a compression arrangement can be also used to press two primary layers together when the secondary layer is not used.

The compression arrangement may be in the form of a roller arranged in use to be brought into contact with the upper surface of the secondary layer and optionally including a roller cooling mechanism. A cooling mechanism may be a water circuit or similar. The main function of the water-cooled roller is to prevent the thermoplastic material from sticking onto the wheel, not to improve the cool-down time.

The primary layer may also be laid utilizing an extruder having a discharge nozzle for laying the primary material onto the substrate or preceding layer. An auger and heater arrangement with a discharge nozzle may be used to melt and extrude the primary material.

An example of such a device is manufactured by CEAD B.V. called the "robot extruder".

Furthermore, the primary material may be laid from an extruder mechanism and the secondary material may be laid from a supply spool mechanism, wherein the supply spool mechanism comprises a heater mechanism arranged to heat the secondary material in advance of being laid, a drive mechanism to drive the secondary material from a spool and through the heater mechanism and an optional cutting arrangement arranged in use to cut or separate fibers contained within the secondary material.

Viewed from another aspect there is provided an additive manufacturing apparatus comprising a robotic manipulator arranged to move in multiple directions and to support a multi-component composite material additive manufacture apparatus as described above, the robotic manipulator arranged in use to follow: (A) a pre-determined movement program to form a multi-layered, multi-material composite component profile; and (B) a pre-determined fiber distribution pattern of continuous or discontinuous fibers.

Also described herein is an aerospace component manufactured according to the method and or apparatus described herein and also to an aerospace component being an aerodynamic component of an aircraft structure, such as a landing gear door as one example.

BRIEF DESCRIPTION OF THE DRAWINGS

One or more embodiments of the invention will now be described, by way of example only, and with reference to the following figures in which.

Figure 1:
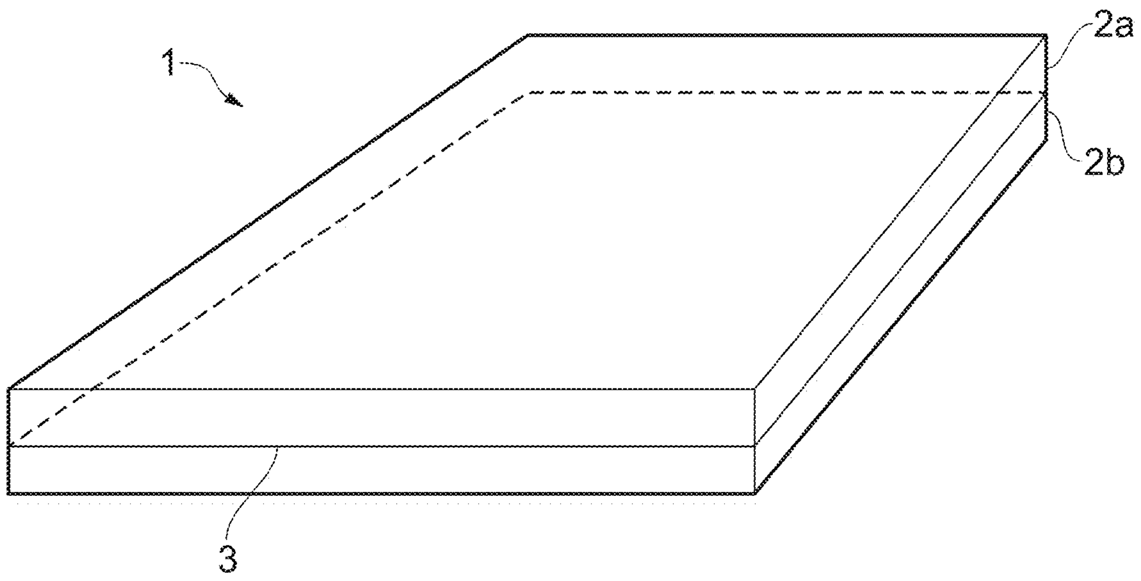
FIG. 1 shows layers of a component formed according to a manufacturing apparatus and method described herein.

While the invention is susceptible to various modifications and alternative forms, specific embodiments are shown by way of example in the drawings and are herein described in detail. It should be understood however that the drawings and detailed description attached hereto are not intended to limit the invention to the particular form disclosed but rather the intention is to cover all modifications, equivalents, and alternatives falling within the spirit and scope of the claimed invention.

Any reference to prior art documents in this specification is not to be considered an admission that such prior art is widely known or forms part of the common general knowledge in the field. As used in this specification, the words “comprises”, “comprising”, and similar words, are not to be interpreted in an exclusive or exhaustive sense. In other words, they are intended to mean “including, but not limited to”. The invention is further described with reference to the following examples. It will be appreciated that the invention as claimed is not intended to be limited in any way by these examples. It will also be recognized that the invention covers not only individual embodiments but also a combination of the embodiments described herein.

The various embodiments described herein are presented only to assist in understanding and teaching the claimed features. These embodiments are provided as a representative sample of embodiments only and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the spirit and scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

It will be recognized that the features of the aspects described herein can conveniently and interchangeably be used in any suitable combination.

DETAILED DESCRIPTION

FIG. 1 shows the fundamental layers of a component formed according to a manufacturing apparatus and method described herein.

As shown in FIG. 1, a composite component 1 is formed of a plurality of layers as described below.

The term ‘composite’ is a term known in the field of, for example, carbon fiber reinforced plastic (CFRP) components which are common in the aerospace industry owing to their light weight and high strength. Composite components are generally formed of a binding resin which encapsulates stronger fibers such as carbon fiber. Carbon fibers have high tensile strengths and when encapsulated in resin materials and hardened can provide very high strength and lightweight components.

Conventionally components are formed by laying up woven fabrics made of carbon fibers into a mold of the desired component shape, impregnating them with resin and then curing them (hardening them) in either a vacuum (called out-of-autoclave) or in a heater autoclave (in-autoclave). These processes are time consuming and expensive.

Figure 2:
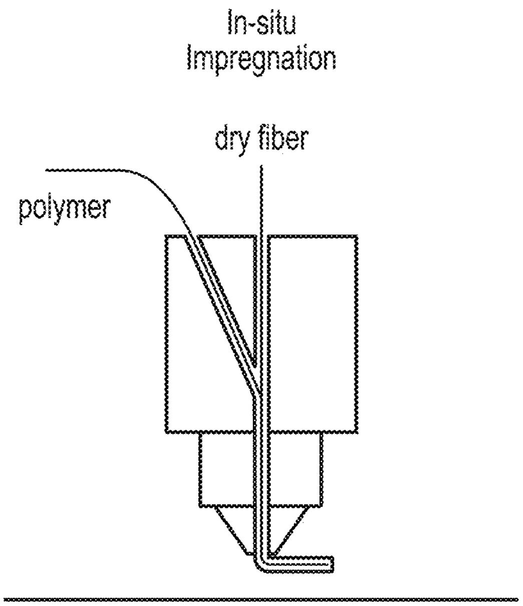
FIG. 2 shows an alternative prior art arrangement of in-situ impregnation manufacturing.

An alternative process which has been developed, involves simultaneously injecting a polymer into a die which also receives a dry fiber. This is illustrated in FIG. 2. Here, the polymer and fiber are brought together in the die which can then be used to lay down or print part of a component. This arrangement has brought some improvements to manufacturing of composite parts and represents a level of 3D printing to composite components.

However, there remain barriers to the use of 3DP composite components toolings in many applications. These barriers are two-fold. First, the intense manufacturing costs in terms of time and equipment result in making the large scale production of composite components prohibitive. Secondly, composite components do not allow for close alignment of coefficients of thermal expansion (CTE) of the material with the desired performance of the end product.

Both of these factors have led to the limited use of 3 dimensional printing (3DP) composites in many applications.

Specifically it has been noted that in prior art ‘3D printing’ autoclave tooling (which is short fiber reinforced) above 2 m in length brings issues regarding thermal expansion, especially when used in high temperature environments such as in the autoclave which can reach curing temperature of 180° C. To date it has not been possible to provide a 3DP manufacturing method that allows for a CTE value as close as the final product as possible and which allows for competitive production methods.

There is provided herein a method and apparatus which is capable of placing continuous fibers impregnated with a thermoplastic in a specific predetermined pattern. The method and apparatus can lay or ‘stack’ several patterns in order to create a shape in three dimensions, i.e., x and y and also depth z. In effect the method and apparatus provide a "sandwich" or laminate structure with layers of thermoplastic filled with 'chopped' or cut fibers or without fibers and pre-impregnated layers of continuous and/or long fibers in unidirectional or bidirectional direction. The material properties created from the final product are important for the desired application and can be tuned to the application needs.

Returning to FIG. 1, an example composite component 1 in its simplest form comprises two thermoplastic layers 2*a*, 2*b* and an intermediate or interstitial layer 3. In the example shown in FIG. 1 the intermediate layer 3 extends (as a ghost surface in the figure) across the whole area of the component 1. As described below this need not be the case.

The two opposing thermoplastic layers 2*a*, 2*b* are arranged on either side of the intermediate layer and may be formed of any suitable thermoplastic material depending on the chosen application.

Examples of materials include:

Aerospace: PESU, PPSU, PEI, PEEK, PAEK and other similar materials;

other industries: PP, ABS, PC, and similar thermoplastic resins.

The intermediate layer 3 acts as the reinforcement layer and comprises reinforcing fibers. These fibers, as described below may be arranged in a number of orientations relative to the thermoplastic layers 2*a*, 2*b*. For example, the fibers may be continuous and aligned with one side edge or may be random or aligned at particular angles with respect to the layers 2*a*, 2*b*.

As described above, the fibers may have high strength in a tensile direction meaning that aligning the fibers in particular directions can increase the tensile strength in that direction. In addition, the thermal characteristic of the component can also be adapted by this selective alignment of fibers, and also by providing breaks or discontinuities in the fiber lengths as described below.

Figure 3:
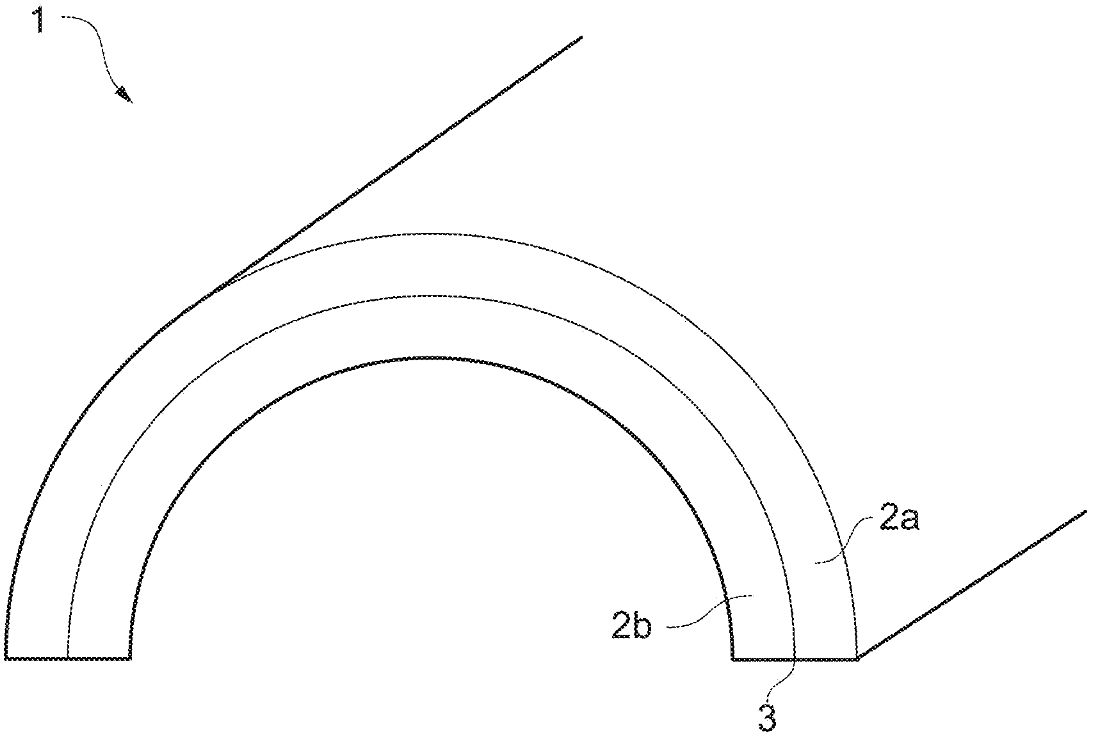
FIG. 3 shows an alternative component formed according to the manufacturing apparatus and method described herein.

FIG. 3 shows an alternative component according to FIG. 1 illustrating a different and more complex geometry.

In FIG. 3 a curved component 1 has been formed by laying the first thermoplastic layer 2*a* over a mold or mandrel (not shown) corresponding to the desired shape of the end component. This laying up may be achieved by mounting the laying up equipment on suitable robotic manipulators or arms as described below.

Next, the reinforcement or/and fiber-containing layer 3 is then laid on the outside of layer 2*a* and finally a second layer of thermoplastic is laid on the outside of the reinforcement (fiber) layer 3, again corresponding to the profile of the component. It will be recognized that complex geometries may be followed by a suitably dexterous robotic arm. The process described herein advantageously applies 2 layers at the same time. One thermoplastic layer with/without short fibers and on top a pre-impregnated layer with continuous or long fibers. The process also allows the printing of only one single layer of thermoplastic with/without short fibers. The feeding with continuous or long fibers can be interrupted during the printing process as required according to the desired component.

The laying up apparatus itself will now be described with reference to FIG. 4. As will be described an apparatus and method described herein involves a separated co-extrusion of pre-impregnated continuous fiber reinforcement with alternating 3D printed layer and continuous fiber reinforcement in one inline step. A continuous process may be realized.

Figure 4:
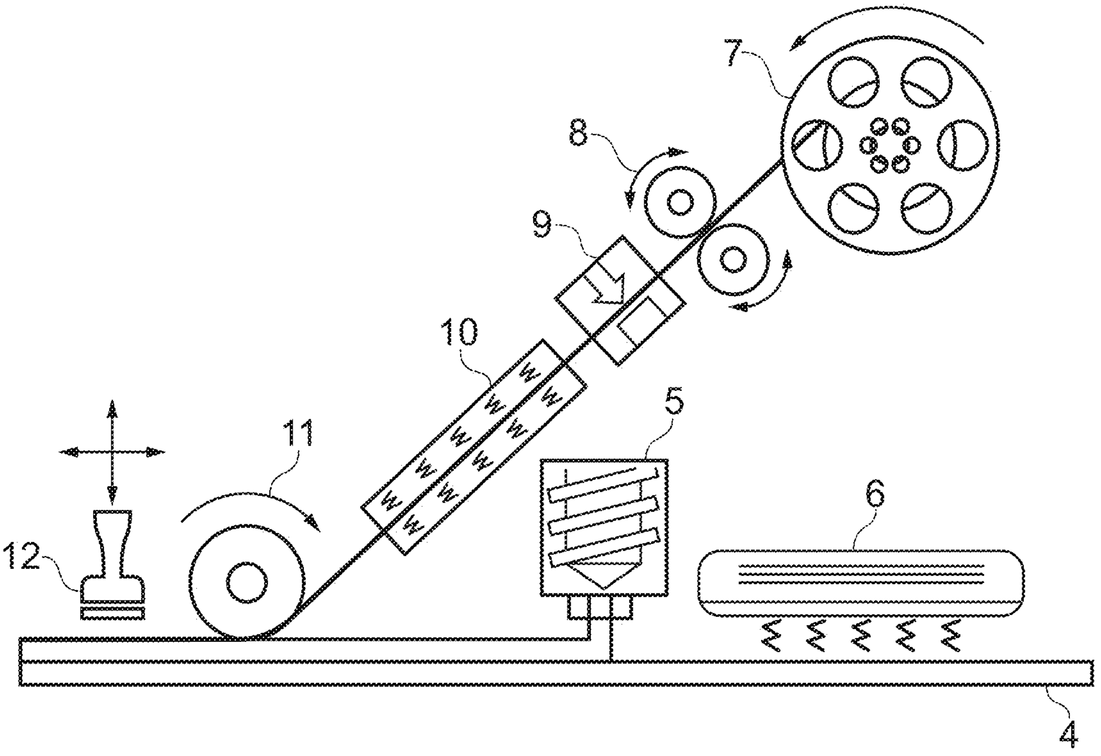
FIG. 4 shows a schematic of the primary sub-elements of the manufacturing apparatus and the associated juxtaposition of the sub-elements in the apparatus.

Referring to FIG. 4 the apparatus comprises, but is not limited to, the following components:

Reference 4 Substrate Support Surface

FIG. 4 illustrates a flat surface as one example but with reference to FIG. 3 it will be recognized that the surface upon which the composite component is formed may be a mold or other shape corresponding to the desired end product. For example, the profile may correspond to a fan blade in which the mold corresponds to the aerodynamic contours of the blade. Similarly, in an application for a landing flap, other contours and reinforcement structures may be provided to be followed.

The substrate support surface may be static or may itself be movable relative to the remainder of the apparatus providing an additional degree of freedom of movement.

The substrate support surface can be pre-heated in order to minimize stresses inside the final part.

Reference 5 Extruder Unit

The extruder unit 5 is in one example a heated auger arrangement which heats a thermoplastic material and forces the material out of a die and onto the substrate support surface or preceding layer of the component being formed. An example extruder unit is manufactured by CEAD. (www.robotextruder.com)

The extruder unit is located after the substrate heater described below in a manufacturing flow direction. The speed and flow rate of the extruder unit may be controlled so as to control the thickness of the thermoplastic layer be laid down and can be increased as manufacturing speed increases or as thickness requirements of the component change. As with the other components shown in FIG. 4 the entire assembly may be pivotally mounted so that components such as that shown in FIG. 3 may be manufactured. The entire unit can be mounted on for instance a 6 axis industrial robot or 5 axis machine for increased freedom.

The extruder unit may eject pure thermoplastic or may alternatively eject a blend of thermoplastic and short fiber reinforcement, i.e., relatively short lengths of reinforcement fibers blended into the thermoplastic. This blend enhances the over strength of each of the thermoplastic layers owing to the tensile strength of the fibers.

Reference 6 Substrate Pre-Heater

The substrate pre-heater acts to pre-heat the substrate or preceding layer of the component before the subsequent layer is laid on top. Heating the previous layer causes the thermoplastic (the primary layer as well as the thermoplastic impregnated fiber material of the secondary layer) to become tacky and sticky which facilitates bonding (welding) of the subsequent layer to the preceding layer surface. It also encourages air pockets and bubbles to be released that could create discontinuities in the component structure.

The substrate pre-heater may heat the substrate or preceding layer using a range of heating sources, for example including infrared, laser or other heat source. In effect the heat source ensures adequate layer fusion with the preceding layer.

The components above refer to the laying up arrangement for preceding layers.

References 7 and 8 Supply Spool & Drive Wheel

The supply spool contains and releases a continuous supply of pre-impregnated continuous fiber material, i.e., the material comprises one or more continuous reinforcement fibers wrapped around a supply spool. An example of one material may be, for example, continuous carbon fiber uni-directional tape impregnated with PESU.

The supply spool may be loaded with material of different widths thereby adjusting the number of passes required to form the width of a desired component.

The material is removed from the spool by the drive wheel or mechanism 8 which is controlled according to the speed of laying of the material. The drive wheel may be in the form of a pair of opposing rollers which pull the pre-impregnated fiber material from the spool and feed the material, through the cutting mechanism to the heaters, described below.

Reference 9 Fiber Cutting Mechanism

The fiber on the spool may be a continuous length of fiber extending through the reinforcement material on the spool. This fiber may be optionally cut at predetermined positions as the material passes through the cutting mechanism. This thereby creates a discontinuous length of fiber, i.e., a plurality of discrete lengths of fiber as opposed to one continuous length. Interrupting of the continuous fibers may lead to an increase in the CTE value.

It also allows different fiber distributions to be realized across each layer and through the part on different layers. The cutting may be achieved by a simple knife or blade mechanism arranged to engage against a stationary block or recess. The cutting mechanism is also used when a layer has ended so that the toolhead can move to the next layer.

Reference 10 Fiber Product Pre-Heater

The drive wheel 8 is activated to drive the reinforcement fiber from the spool through fiber product pre-heater. Here, by means of infrared or other heat source, the continuous or not cut fiber material is heated up to a fusion temperature, i.e., a temperature at which the material is sufficiently melted that it will bond with the preceding layer. In one example, for a material PEI this will be heated to approximately 210 degrees Celsius over a period of approximately 5 seconds. An arrangement of multiple pre-heaters can be used in the toolhead, for which each pre-heater can be set at a different process temperature.

Reference 11 Compaction Roller

As shown in FIG. 4 the line of movement of the reinforcement fiber from the spool is such that it intersects with the preceding layer at an angle to the horizontal. At this point a roller 11 is located which is controlled to rotate such that the radial speed corresponds to the feed speed of the drive mechanism. The roller 10 acts to compact and consolidate the reinforcement layer with the preceding layer through the application of a small vertical force. The compaction roller can be set in a defined manner in the z-height.

This ensures secure bonding of the heated reinforcement layer and the preceding layer. It will be recognized that both layers have been heated and are therefore able to fuse together.

The compaction roller may additionally be cooled, for example through water or other cooling means, to consolidate the bond between the two layers that are being brought together at this point, and it also prevents sticking to the compaction roller. The temperature of the roller can be controlled in order to create the best consolidation and process condition as possible.

Reference 12 Anti Slip Press

The arrangement may also be provided with an optional anti-slip press which is arranged to prevent the fiber material (secondary layer) from slipping relative to the thermoplastic material (primary layer). This press may be used at the start of the process and optionally through the remainder of the process if the fusion bond is not sufficient to prevent horizontal separation of layer during the forming process.

Each of the steps above may be advantageously computer controlled in terms of rotational speed of the rollers, flow rate of extruder, temperature of the heaters, and pressure of the consolidation roller and anti-slip press. Thus, a smooth and continuous process may be realized.

After the first pair of layers, i.e., one thermoplastic layer and one reinforcement layer has been laid, the next pair may be laid on top. The process can be repeated until the desired product thickness/height has been reached.

As described herein the invention combines two materials in one process. This combination of materials creates a laminate which has better properties than the current materials available for large scale 3D printing. Combining a continuous fiber with an additional thermoplastic material layer has the benefit of reducing cost price and increasing production output in comparison to automatic tape placement technology. Moreover, the reinforcement with continuous and/or long fibers creates a composite material with very low thermal expansion. The use of the invention also ensures a high level of automation, reducing material and labor cost and the need for labor skills.

The selective distribution of the reinforcement fibers in each layer will now be described.

There are two aspects to the operability of the apparatus described herein:

(A) First, the linear distribution of the reinforcement fibers may be selectively controlled. This refers to selectively cutting or separating the fibers so that a layer of reinforcement comprises a series of fibers, all aligned, but with discrete dimension in a lengthwise direction. These may be separated by small or large spaces depending on the thermal and/or mechanical characteristics of the desired components. Each layer of the component may be provided with the same or different distribution or separation.

(B) The second aspect is the selective angular displacement of fibers in subsequent layers. This refers to the additional functionality of the apparatus that not only allows distribution of fibers between each layer to be modified (as described in paragraph A above) but additionally allows for an angular displacement between one or more subsequent layers making up the sandwich or laminate of the component.

These two options provide for huge variability in the tensile strength and thermal performance of each layer and thus the resulting component. Modelling allows the optimal distribution across and between layers to be determined and then the apparatus described herein programmed to deposit the reinforcement fibers in the desired profile across and depth-wise through the component.

Figure 5:
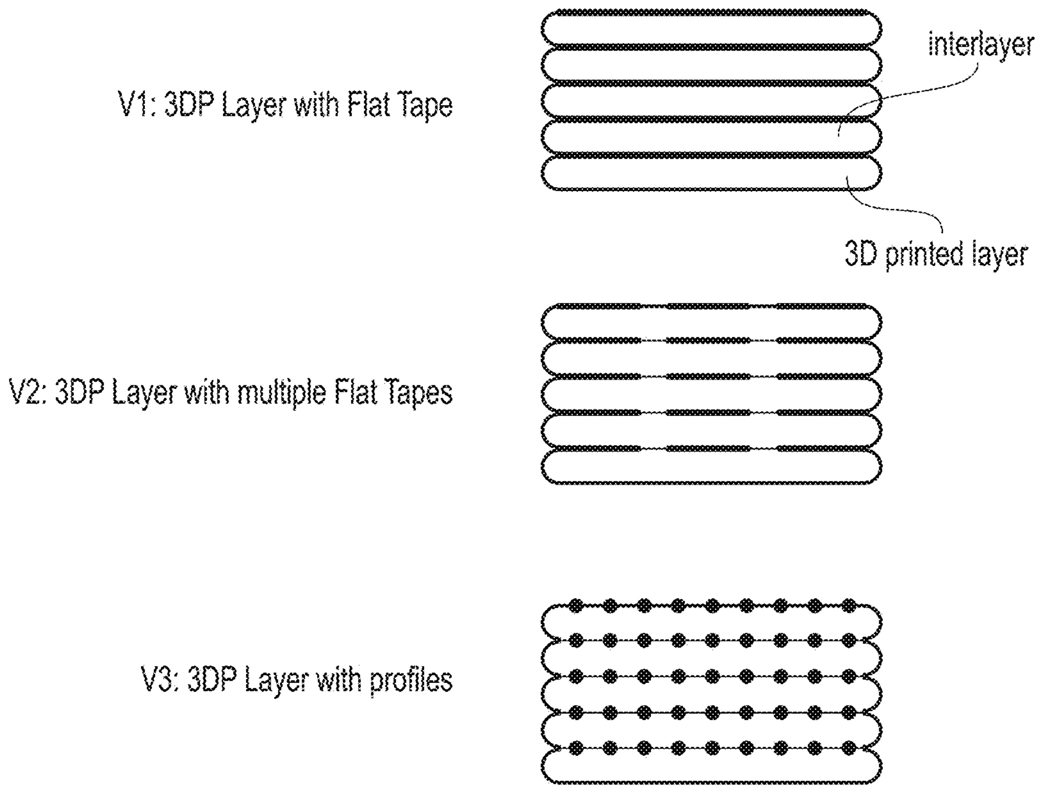
FIGS. 5 V1, V2, and V3 illustrate alternative reinforcement fiber distribution patterns and types.

FIGS. 5 V1, V2 and V3 illustrate alternative reinforcement fiber distribution patterns and types as will now be described.

For example, in a basic arrangement alternating 3D printed layers may be provided, each with a reinforced interlayer on top wherein both layers can be printed as part of the same process, i.e., immediately sequentially according to the apparatus described herein.

In another example, a 3D printed layer may be provided made from thermoplastic or thermoset matrix, with or without short fiber reinforcement may be created.

In yet another example, a reinforced interlayer may be provided made from pre-impregnated thermoplastic or thermoset in which a matrix with long and/or continuous fiber reinforcement is provided.

Each arrangement may have its own specific advantages for an application and each can be conveniently manufactured according to the apparatus and method described herein.

Returning to FIG. 5, the examples shown are in cross-section and illustrate visually the potential distribution of the reinforcement layers across and through the component.

In example V1 an interlayer reinforcement uni-directional (UD tape) or multi-directional (weaving, NCF) may be used. Here one tape may be used for each interlayer with an arrangement in which there is symmetrical or asymmetrical tape with widths less than, equal to, or greater than the width of the 3D printed layer width.

In example V2, an interlayer consists of two or more flat tapes in which the arrangement is symmetrical or asymmetrical.

In example V3 and interlayer consists of one or more profiles with UD fiber reinforcement. The cross-section may be round, square, variable, or another suitable cross-section.

In each of the examples described herein the continuous fiber material may be selected from any suitable stock of material including, but not limited to, carbon, glass, aramids, ceramic, metallic, optical, and other high performance or technical fibers, e.g., Dyneema.

Figure 6:
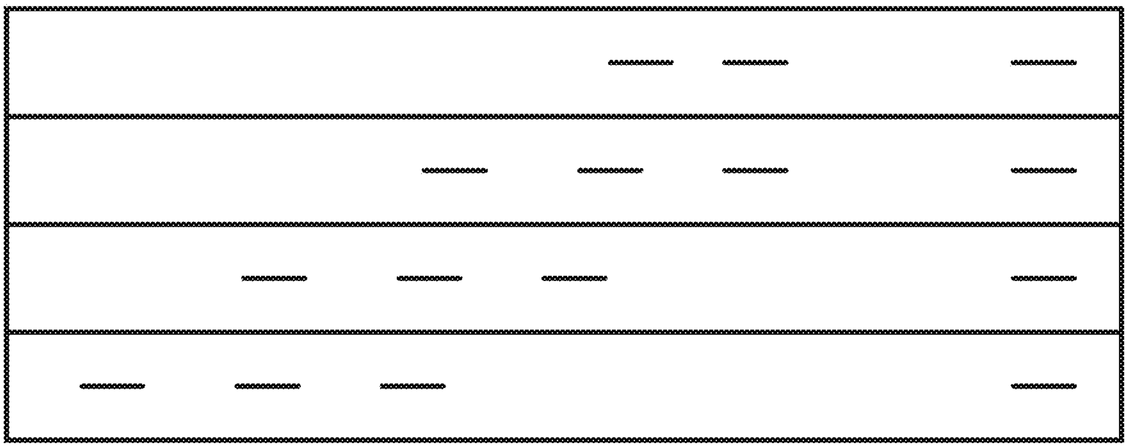
FIG. 6 illustrates a complex/hybrid distribution pattern of reinforcement fibers and associated layers.

Other materials may also be used together with the reinforcement fibers in the intermediate or interlayer such as electric conductive materials or heatable materials. Thus, an arrangement may be provided which can be used to print toolings with integrated heating for curing FRP parts out of autoclave or oven. Furthermore, materials may be introduced which may be used to measure the temperature inside the printed tooling/part Furthermore, the following may additionally be adapted:

variable fiber volume fraction changeable matrix/fiber ratio combination of short fiber or non-reinforced matrix with continuous or long fibers in uni- or bi-direction FIG. 6 illustrates a further more complex/hybrid distribution pattern of reinforcement fibers and associated layers. In the example shown in FIG. 5 a non-linear distribution is shown which may correlate to thermal and/or mechanical requirements for the given application. The apparatus and method advantageously allows for configurations such as that illustrated (for example only) in FIG. 5 to be realized.

Figure 7:
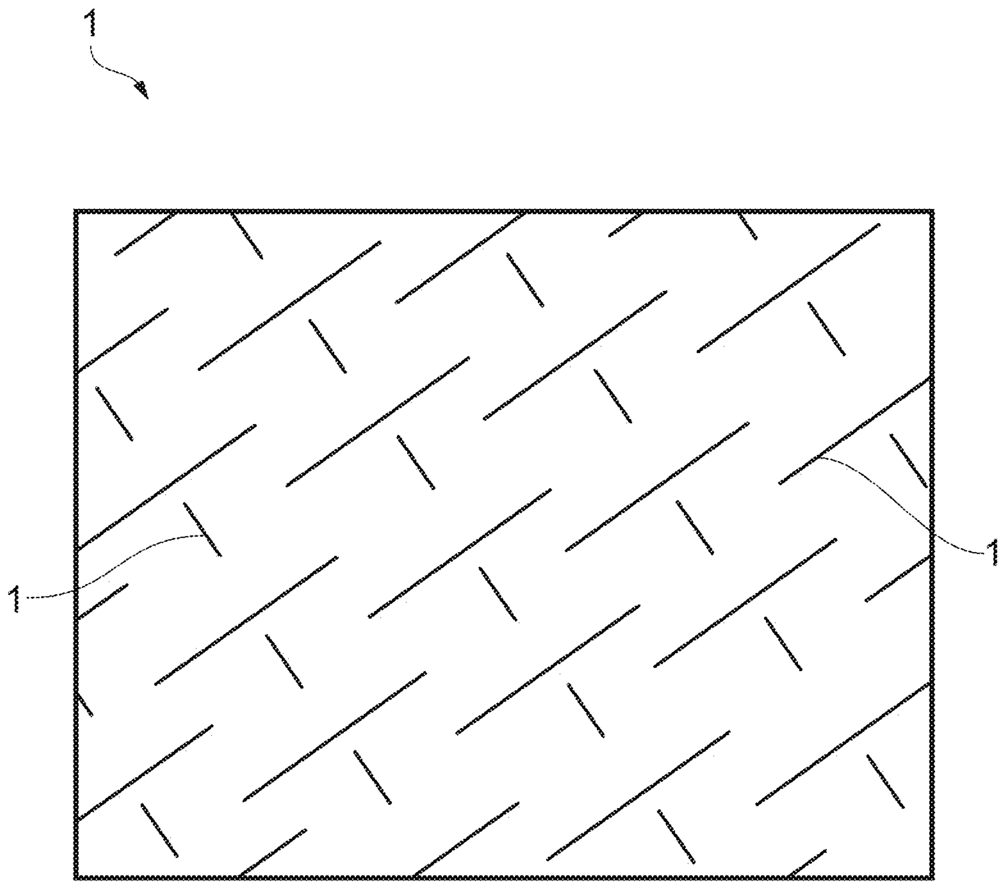
FIG. 7 illustrates how successive layers may be laid at different angles to preceding layers.

FIG. 7 illustrates the angular control that the apparatus and method additionally provides with the lines indicating different orientations of fibers through the depth of the component.

As described above the arrangement described herein provides significant flexibility in designing and constructing multi-material, multi-layer additive manufactured composite components. Specifically, the components can be optimized for load carrying properties, stress and fatigue resistance and also thermal performance in terms of controlled CTE values.

An application of the apparatus and method described herein is the substitution of tooling and intensifiers, which are used for the curing of aircraft composite parts at high temperatures in the autoclave. For example, CFRP intensifiers aerospace components can be replaced using such a technique. Furthermore, large composite tooling which needs geometric accuracy at high temperatures, could also be realized.

The spools can also be advantageously changed during printing. For example, an automatic spool changer could be used when printing large tooling which requires several 1000 meters of reinforcement. Furthermore, the spool may also be used within a cartridge (housing) to avoid moisture take up. Thus, a more controlled environment is provided for the tape. Humidity and temperature conditions may thereby be controlled. This may also make changeover of the spool faster and more convenient using such an enclosure.

The invention claimed is:

1. A method of forming a multi-layer thermoplastic component, the method comprising the steps of:

(A) before laying a first layer of thermoplastic material without fibrous material, determining a desired thermal operating profile of the component;

(B) before laying the first layer of thermoplastic material without fibrous material, determining a fiber distribution profile of the component corresponding to the desired thermal operating profile of the component;

(C) laying the first layer of thermoplastic material without fibrous material into a predetermined shape;

(D) laying, on top of or adjacent to the first layer, a second layer of thermoplastic material together with fibrous material compressed onto the thermoplastic material;

(E) laying, on top of or adjacent to the second layer, a third layer of thermoplastic material together with fibrous material compressed onto the thermoplastic material; and (F) laying one or more subsequent layers of thermoplastic material with or without fibrous material on top of or adjacent to one or more preceding layers, until a predetermined number of layers have been laid;

wherein lengths and/or distribution of the laying of the layers that have fibrous material in the steps (D)-(F) with respect to the one or more preceding layers that have fibrous material is changed between different layers of the component; and wherein the laying of the first, second, third and/or subsequent layers in the steps (C)-(F) is performed according to the fiber distribution profile.

2. The method of claim 1, wherein the fibrous material is selected from (a) a continuous fiber extending through the thermoplastic material; or (b) a plurality of discrete discontinuous fibers extending through the thermoplastic material.

3. The method of claim 1, wherein each of the first and second layers are laid as a plurality of adjacent strips, each strip abutting with an adjacent strip to form a continuous layer surface extending in multiple directions.

4. The method of claim 1, wherein the fibrous material within the second layer may be selectively cut or separated at predetermined lengths before being laid upon or adjacent to the first layer.

5. The method of claim 4, wherein the fibrous material within the second layer are cut at lengths according to a predetermined fiber length distribution across each layer and through the thickness of the component.

6. The method of claim 1, wherein the second layer is laid after the first layer.

7. The method of claim 1, wherein the second layer is laid at an angle with respect to the angle at which the first layer has been laid.

8. The method of claim 1, wherein an upper surface of the first layer is heated prior to the second layer being laid upon the first layer.

9. The method of claim 1, wherein after being laid a compaction force is applied to an upper surface of the second layer.

10. The method of claim 9, wherein the second layer is cooled simultaneously with the compaction force being applied to the upper surface.

11. The method of claim 1, wherein the desired thermal operating profile includes at least one thermal property that varies within the component.

12. A method of forming a multi-layer thermoplastic component, the method comprising the steps of:

(A) before laying a first layer of thermoplastic material without fibrous material, determining a thermal operating profile of the component;

(B) before laying the first layer of thermoplastic material without fibrous material, determining a fiber distribution profile of the component corresponding to the thermal operating profile of the component;

(C) laying the first layer of thermoplastic material without fibrous material into a predetermined shape;

(D) laying, on top of or adjacent to the first layer, a second layer of thermoplastic material together with fibrous material compressed onto the thermoplastic material (E) laying, on top of or adjacent to the second layer, a third layer of thermoplastic material together with fibrous material compressed onto the thermoplastic material; and (F) laying one or more subsequent layers of thermoplastic material with or without fibrous material on top of or adjacent to one or more preceding layers, until a predetermined number of layers have been laid;

wherein the lengths and distribution of the laying of layers that have the fibrous material in the steps (D)-(F) with respect to the one or more preceding layers that have fibrous material is changed between different layers of the component being manufactured; and wherein the laying of the first, second and/or subsequent layers in the steps (C)-(F) is performed according to the fiber distribution profile.

13. A method of forming a multi-layer thermoplastic component, the method comprising the steps of:

(A) before laying a first layer of thermoplastic material without fibrous material, determining a thermal operating profile of the component;

(B) before laying the first layer of thermoplastic material without fibrous material, determining a fiber distribution profile of the component corresponding to the thermal operating profile of the component;

(C) laying the first layer of thermoplastic material without fibrous material into a predetermined shape;

(D) laying, on top of the first layer, a second layer of thermoplastic material together with fibrous material compressed onto the thermoplastic material (E) laying, on top of the second layer, a third layer of thermoplastic material together with fibrous material compressed onto the thermoplastic material; and (F) laying one or more subsequent layers of thermoplastic material with or without fibrous material on top of one or more preceding layers, until a predetermined number of layers have been laid;

wherein the lengths and/or distribution of the laying of layers that have the fibrous material in the steps (D)-(F) with respect to the one or more preceding layers that have fibrous material is changed between different layers of the component being manufactured; and wherein the laying of the first, second and/or subsequent layers in the steps (C)-(F) is performed according to the fiber distribution profile.

* * * * *